United States Patent

Buhler et al.

[15] 3,653,921
[45] Apr. 4, 1972

[54] BUTTER FLAVORED FOOD ADDITIVE CONCENTRATE

[72] Inventors: Allen C. Buhler, Racine, Wis.; Eric Engel, Winnetka, Ill.; John H. Nelson, Waukesha; Clyde H. Amundson, Madison, both of Wis.

[73] Assignee: Morton-Norwich Products, Inc., Chicago, Ill.

[22] Filed: Mar. 27, 1969

[21] Appl. No.: 811,214

Related U.S. Application Data

[63] Continuation-in-part of Ser. No. 751,743, Aug. 12, 1968, abandoned.

[52] U.S. Cl. ................................................99/140 R, 99/54
[51] Int. Cl. ......................................................A23l 1/26
[58] Field of Search..........................99/140, 54, 56, 57, 123

[56] References Cited

UNITED STATES PATENTS

| | | | |
|---|---|---|---|
| 2,699,995 | 1/1955 | Hull | 99/57 |
| 2,794,743 | 6/1957 | Farnham | 99/56 |
| 3,190,753 | 6/1965 | Claus et al. | 99/54 |
| 3,262,788 | 7/1966 | Swanson et al. | 99/199 |
| 3,477,857 | 11/1969 | Colburn | 99/140 |

OTHER PUBLICATIONS

McDowall, " The Buttermaker' s Manual," Vol. 1, New Zealand University Press, (1953) pp. 753, 807– 809.

*Primary Examiner*—Morris O. Wolk
*Assistant Examiner*—Warren Bovee
*Attorney*—Pendleton, Neuman, Williams & Anderson

[57] ABSTRACT

A concentrated butter flavorant and a method of manufacturing the same for addition to food to impart a butter-like flavor thereto comprising a lipase enzyme-modified milk fat, flavor and aroma principles, a diluent, and a bicarbonate buffering agent. The concentrate may be diluted as desired for specialized uses and may be provided in dry form.

20 Claims, No Drawings

BUTTER FLAVORED FOOD ADDITIVE CONCENTRATE

CROSS-REFERENCE TO RELATED APPLICATION

This application is an improvement in the subject matter of copending application, Ser. No. 721,519, filed Apr. 15, 1968, now abandoned, and a continuation-in-part of Ser. No. 751,743, filed Aug. 12, 1968 now abandoned.

BACKGROUND OF THE INVENTION

1. Field of the Invention

The field of this invention is broadly that of concentrated food additives and more particularly that of concentrated food additives possessing a typical balanced flavor and aroma which is characteristic of natural butter.

It is a well established fact that the populace in general enjoys the flavor of butter and its gustatory effect on a variety of food products. This is attested to by the widespread use and sale of butter, butter substitutes, and food products prepared with butter. The overwhelming acceptance of the flavor of butter in comestibles has naturally spurred research into the identity of the flavorful constituents of butter and activity into the provision of a variety of synthetic or artificial butter flavorants.

2. Description of the Prior Art

It is well known in the art of food preparation that there are many types of foods, such as baked flour products, cheese products, meat, vegetables, and the like, in which a typical butter flavor or modified butter flavor is desirable, if not essential. It is also recognized that for numerous apparent reasons the use of whole butter is not practical, or for that matter, is not always possible. As a result of the foregoing, various methods have been suggested for making butter concentrates from whole butter, and/or for making artificial butter flavors. Thus, the prior art has suggested the incorporation of selected lactones, diacetyl, constituents of cultured butter, short-chain fatty acids and alcohols, and other chemical compounds into oleaginous foodstuffs to impart a butter flavor. However, all of these methods and products have one or more shortcomings. For example, the oleaginous or paste-like butter concentrates, while in many instances providing a typical flavor and aroma of real butter, have only limited shelf-life and storage stability if the product is not kept under constant refrigeration. Moreover, such fat-based concentrates have a high caloric content per unit of flavor strength which is, of course, undesirable for use by individuals who must restrict their caloric intake. Lipase enzyme-modified milk fat emulsions have long been available commercially to food processors. These processes are used to impart, enhance, or modify butter or buttermilk and other dairy product flavors in a variety of bakery products and margarine. However, these emulsions per se have pungent, "cheesy" odors, considered by many to be objectionable, which have limited their appeal industrially and have virtually precluded their use in the retail market for direct sale to consumers. On the other hand, various artificial flavoring materials in dry form have failed to capture a typical butter flavor and are not desirable for various other reasons. For example, diacetyl, one of the most commonly used additives, is unsuitable in that if used in excess or improperly blended with other flavorful components, it will impart an exceptionally strong and atypical flavor and aroma to the product. Furthermore, unless the food product is immediately used, diacetyl per se ordinarily dissipates very rapidly. It is recognized that the use of free butyric acid or its salts as additives in artificial flavoring materials must be restricted to minute amounts, measured and mixed with considerable care, inasmuch as an excess of the added free acid or salts can result in a product having the taste and odor of cheese or of rancid butter. Additionally, free butyric acid has been found to be unsuitable, from the commercial point of view, for some of the same reasons mentioned above relative to diacetyl, including dissipation of flavor after relatively short periods of time. Select lactones, such as the hydroxy lactones, normally provide a highly intense butter flavor initially, but again the flavor may dissipate after a short time. Moreover, there is often an unpleasant atypical flavor in foodstuffs flavored with such materials. Finally, the prior art has failed to disclose a dry, storage-stable, concentrated flavor product suitable for use by the consumer, which itself has a typical butter flavor, imparts such flavor to foodstuffs when added thereto, and has a low caloric content for a given flavor strength unit.

Accordingly, it would be desirable to overcome the disadvantages of the prior art and provide a concentrated butter flavorant which has a typical butter flavor, storage stability, and significantly fewer calories than butter and which can be diluted as desired and provided in a variety of forms.

SUMMARY OF THE INVENTION

The present invention therefore provides a concentrated food additive having a characteristic, pleasing butter-like flavor and aroma which, when employed in small amounts, will impart a typical butter flavor to a food material when added thereto.

It also provides a butter flavor concentrate in dry form which will elicit a typical butter-like sensation on the taste buds and the olfactory senses when employed in a food product. The butter flavor concentrate of the invention, when added in small quantities to food, imparts a true characteristic butter-like flavor, but has a low caloric content relative to butter. One product of the invention may also be characterized as a concentrated butter flavorant in dry form which has long shelf-life, without refrigeration. The invention also relates to a process for preparing the concentrated butter flavorants and to a process for preparing the product in dry free flowing form.

According to the present invention, there is provided a flavor concentrate in various forms capable of imparting a true butter flavor to foodstuffs and having shelf-storage stability and a low caloric content relative to butter, which is based on and derived from milk and/or milk constituents, particularly milk fat. Broadly, the concentrate comprises a lipase (sometimes known as esterase) enzyme-modified milk fat or butter oil, a buffering agent or neutralizing agent, an edible diluent and at least one flavor and aroma principle including butyric acid and a compound selected from the group consisting of esterified butter oil, diacetyl and mixtures thereof. If desired, minor amounts of seasoning materials, condiments, coloring agents and additives which contribute special physical or savory effects can be employed in conjunction with the concentrate. The concentrate has a butter-like aroma and, as hereinafter more fully elaborated, has many times the flavor strength of conventional butter on a weight basis, permitting its use in relatively minor amounts, thereby representing a substantial potential economy to the user. Moreover, there are significantly fewer calories in the concentrate than in whole butter. The product is stable without refrigeration for extended periods of time.

In the preparation of the concentrate of the present invention, either milk fat, derived directly from whole milk, or butter oil derived from butter, may be used as the substrate for the enzyme-modification process. A milk fat or butter oil emulsion is admixed with a lipase (esterase) enzyme as described in U.S. Pat. No. 2,794,743, and thereafter incubated. During the incubation period, the enzyme system catalytically releases fatty acids from the butter-fat and results in certain other end products. Specific action of the lipase system releases volatile, flavorful, fatty acids, including butyric, caproic, caprylic and capric, in much greater molar concentrations than, but together with, long-chain fatty acids. The action is controllable and reproducible and therefore the relative amount of each type of volatile, flavorful fatty acid evolved is virtually constant from batch to batch. The lipase modification of the butter-fat is carefully monitored during the incubation period until a predetermined quantity of free fatty acids is produced. The system is then heated to completely destroy enzyme activity and reduce the bacterial counts to a very low level.

It is understood that the term "lipase enzyme-modified milk fat" as employed herein and in the claims means the product obtained when milk fat or butter oil has been subjected to the above described process.

Surprisingly, it has been found that the admixture of the above emulsion with a diluent, a buffering agent and flavor or aroma principles provided a product having a pleasing, butter-like aroma having great acceptability to consumers, as hereinafter more fully disclosed, and free from pungent, objectionable, cheese-like and rancid characteristics.

Depending upon the concentration of the various components it is possible to obtain a product having a flavor concentration of the order of magnitude of up to about 150 times that of butter, as determined by taste test evaluation procedures, that is stable at room temperature for prolonged periods of time without modification. It may, however, be desirable to incorporate minor amounts of anti-oxidants, such as butylated hydroxyanisole and citric acid to retard oxidative rancidity. As is readily appreciated, so intense a flavor concentration makes it suitable for use in industrial baking or food processing applications as well as for use by consumers for direct addition to prepared foods. The concentrate can be modified by further dilution of course, to any desired degree of flavor concentration and can be provided in a variety of physical forms for specific end uses. Thus, for example, the concentrate can be diluted with suitable liquid diluents to provide a liquid system having a preselected butter flavor concentration, or it can be diluted with suitable solid carriers or diluents and dried to provide a butter flavorant in dry form with specific physical attributes and flavor concentration relative to butter, or it can be processed with a combination of liquid or solid diluents to provide semisolid or paste-like compositions.

A buffering agent incorporated in the concentrate functions to stabilize and control the pH of the composition by converting free fatty acids into acid salts. This is important in suppressing undesirable (pungent) aroma notes associated with lower fatty acids and also as a means for retaining and controlling the normally volatile fatty acid fractions contributing to the desirable butter-like characteristics of the product during processing and storage. These aromatic flavorful fatty acid fractions are released when the concentrate is added to normally acidic foods. In production, the buffering agent may be added directly to the butter oil or milk fat emulsion prior to, during and/or after the lipase enzyme-modified process, or may be added in whole or in part when preparing various concentrates, depending on the acidity contributed by the diluent or diluent mixtures used.

Exemplary of suitable buffering agents are sodium bicarbonate and potassium bicarbonate. It is to be understood that while the sodium and potassium bicarbonates are preferred, other nontoxic edible buffering and neutralizing agents which do not contribute adverse flavor notes may be employed in conjunction therewith, or in place thereof. Among these are sodium and potassium tartrates, hydroxides, carbonates and gluconates. The concentration of buffer employed varies according to the particular flavor note desired, but the total buffering substances added at various steps in the production of the flavor concentrate should be in an amount sufficient to adjust the pH so that 10 grams of the product in 100 ml. of distilled water will have a pH ranging broadly from about 6 to 9.5 and preferably from about 6.2 to 7.

Generally the amount of buffering agent used to achieve the neutralization in the processing steps varies but up to about 15 percent is usually sufficient and up to about 10 percent is preferred on an overall composition basis. The amount added to obtain the desired pH will depend somewhat on the type of diluent added, some being more acidic (e.g., whey) than others. It should be understood that when bicarbonate buffers are used decomposition occurs by virtue of the reaction with the acidic diluents and carbon dioxide is liberated with the end result that the final product contains little bicarbonate per se.

Numerous additives, carriers or diluents may be employed to impart special properties. Illustrative materials are milk solids, such as condensed milk or dried milk solids, non-fat milk solids such as, condensed skimmed milk and non-fat dried milk solids, lactose in both unstable and stable form, unstable whey, stable whey, delactosed whey, sucrose, dextrose, or milk solids mixed with fructose or dextrose, corn syrup solids, dextrins, edible fats, and oils, gums, proteinaceous substances, such as gelatin or caseinates, cellulose gums, carboxymethylcellulose, condiments and the like.

Delactosed whey, as the term is used herein, is understood to mean whey which has had a portion of its normal lactose content removed, and also includes delactosed wheys which have been partially demineralized. Proteinaceous substances, such as gelatins and caseinates also perform the additional function of retention of volatile flavor components by encapsulation or encasement.

The special properties of viscosity, mouth feel and tactile response, all of which are associated with melted or partially melted butter, can be achieved by the incorporation of cellulose gum and/or other thickening agents.

Butyric acid, in very small amounts, is a known constituent of butter. When added in significant concentrations and properly balanced against the other flavorful components of the present concentrate, and in combination with the proper proportion of buffering agent, it serves to intensify the butter-like aroma and flavor notes provided by the buffered lipase enzyme-modified milk fat emulsion. Diacetyl and esters of butter oil or milk fat are flavor adjuncts which lend their own characteristic flavor notes and augment the total effect of the concentrate.

The presently described flavor concentrate may contain an edible fat or oil as a diluent or diluent component to aid in the promotion of a tactile response, or provide the sensation of butter in the mouth of the consumer. Thus, the oil imparts the physical sensation of slight oiliness to the concentrate when consumed, which many people associate with butter. Illustrative materials which can be used include the vegetable oils, such as corn oil, cottonseed oil, soya bean oil, and coconut oil, as well as natural butter oil and a spray dried product high in butter fat. Depending upon the oil selected, the oil can contribute to the flavor of the finished product.

It may be desirable to incorporate minor amounts of condiments or seasonings, such as table salt (NaCl), onion, garlic and celery salts, and the like. Normally, the optional seasoning ingredients will comprise up to a maximum of about 0.2 part per part of total composition. U.S. Certified coloring agents can be added to impart a yellow butter-like color. Sugars may also be added.

Another aspect of the present invention is a process for providing a concentrated food additive composition which comprises the steps of adding a lipase enzyme system derived by grinding and drying the edible tissue from between the base of the tongue and trachea of milk fed animals (as described in U.S. Pat. No. 2,794,743), to a milk fat aqueous emulsion, incubating the admixture at temperatures between about 80° and 100° F. to form the lipase enzyme-modified milk fat, inactivating the enzyme by heating at an elevated temperature (160°–65° F. or above).

To the inactivated mixture are added flavor and aroma principles including butyric acid and a compound selected from the group consisting of diacetyl and an esterified butter oil. The flavor and aroma principles in the aggregate are used in amounts of up to about 14 percent by weight of the lipase enzyme-modified milk fat, of which the butyric acid constitutes up to about 10 percent and the diacetyl or esterified butter oil 2 percent respectively. The most preferred embodiment of butyric acid is about 8 percent and up to about 2 percent of diacetyl and/or 2 percent of esterified butter oil. In the most preferred instance, all three components are present in the amounts indicated, although it is possible to utilize butyric acid and either the diacetyl or the esterified butter oil additives.

Depending upon the type of end product desired the further processing to incorporate the lipase enzyme-modified milk fat with a diluent can take a variety of forms. For example, where liquid, semi-solid or paste-like products are desired, the lipase enzyme-modified milk fat may be treated to remove water and incorporated with the liquid or semi-solid diluent which may be exemplified by corn oil, cottonseed oil, soya bean oil and the like. Where a highly concentrated product is desired, of the order of magnitude of about 100 to 150 times the flavor strength of butter, a high proportion of enzyme-modified milk fat is employed, such as for example, from about 50 to 95 percent by (dry) weight (5 to 50 percent diluent). On the other hand more dilute products can be prepared having a flavor strength of the order of 5 to 10 times that of butter by using from 1 to 10 percent of enzyme-modified milk fat and 90 to 99 percent diluent. In general, a range of products containing from about 1 to 95 percent lipase enzyme-modified milk fat can be prepared to meet the particular end use desired. The same general observations made with respect to liquid concentrates may also be applied to dry concentrates.

In processing a dried flavor concentrate, the diluent and lipase enzyme-modified milk fat are combined in the presence of water, the pH adjusted to from about 6 to about 9.5 by the addition of a buffering agent. The buffered admixture is homogenized and then dried by one of a variety of drying procedures such as spray drying, foam drying, sheeting or roller drying or the like. Where a dry particulate product having a high flavor strength is desired, i.e., 100 to 150 times the flavor strength of butter, the proportions are the same as given for liquid concentrates. In the case of spray drying, the amount of enzyme-modified milk fat may range up to about 80 percent, preferably 75 percent and most preferably up to about 70 percent of the product on a dry weight basis, with the balance to 100 percent being diluent in each of the above instances. A portion of the diluent may be replaced in part with gelatin which may be used in amounts of from 2 percent to about 10 percent. Likewise, a portion of a dry diluent can be replaced with an edible oil, however, the aggregate amount of lipase enzyme-modified milk fat and edible oil should not exceed the range of proportions set forth for the lipase enzyme-modified milk fat.

DESCRIPTION OF THE PREFERRED EMBODIMENTS

Primarily for direct consumer use and only secondarily for industrial use, it is preferred to provide a dry butter flavor agglomerated concentrate having up to about 20 times the flavor concentration of butter, and having the following properties:

1. A dry, granular agglomerated form having shelf-storage stability;
2. A typical or balanced butter flavor without any harsh pungent or cheese-like aromatic or flavor notes;
3. Immediate flavor release and tactile response to the palate when tasted after adding to foodstuffs containing moisture; and
4. An aroma in the concentrate per se which simulates that of natural butter.

These desiderata are attained by a process comprising admixing a diluent, such as non-fat milk solids, delactosed whey and gelatin with the lipase enzyme-modified milk fat emulsion flavor concentrate and spray drying to provide a dry flavor concentrate having about 50 to 100 times the flavor concentration of butter. The product is further treated by admixing the spray dried product with a combination of unstable whey (or partially unstable whey), and stable whey and additional buffering agent, and thereafter agglomerating and drying the mass to form the dry finished agglomerated or instantized product having a flavor concentration up to about 10 or 20 times that of butter. The amount of buffering agent added is sufficient to produce a pH in the final product as previously described. The term "agglomerating," as used herein, means that process for forming clusters or "agglomerates" of pulverulent materials by the use of moisture, either in the form of high humidity, or steam. It is a means for decreasing the bulk density of a substance through random packing of aggregates of particles and also of enhancing the rate of aqueous dispersibility and increasing the flow properties of dry solids. Agglomeration is also known as "instantizing."

The proportion of the combination of wheys employed can be as much as 10 parts of aggregate whey per part of spray dried concentrate. The ratio of unstable whey to stable whey may range from about 1:1 to 3:1.

Whey, which is a liquid by-product from the manufacture of cheese, can be dried in a variety of forms. Useful in the present invention are the forms of whey characterized as unstable whey and stable whey. The major constituent of whey is lactose, known as milk sugar. The amorphous form of lactose is extremely hygroscopic, and for that reason, lends itself readily for use as an agglomerating or adhesive bonding aid. Whey can be dried in such a manner that the viscosity of the solution increases fast enough to prevent lactose crystallization, the result being "unstable whey," so called because it is extremely hygroscopic and tends to pick up moisture to form the stable crystalline lactose alpha hydrate. Stabilized whey, on the other hand, has dried under conditions permitting the lactose to crystallize to the hydrate form during the drying processes. This whey is therefore not nearly as hygroscopic and, consequently, is not as sticky as the amorphous form when contacted with water or steam. It is, therefore, not as well suited as an agglomeration aid as is its unstable whey counterpart. It is also understood that whey may be dried in such a manner as to produce a partially stable whey where part of the lactose exists in the crystalline state and the balance in the amorphous state. This is referred to in the industry as "partially stabilized whey." Such a partially stabilized whey can be prepared in a manner so as to achieve the equivalent properties of a blend of stable and unstable whey. Depending upon the type of agglomeration equipment used, the ratio of stable whey to unstable whey can be adjusted to provide the proper degree of stickiness. For example, one type of agglomerator which supplies a high percentage of moisture to the product, would therefore require smaller quantities of the unstable whey product to yield a sticky agglomeration medium. As a matter of fact, too large a proportion of the unstable whey compound would tend to cause product sticking in the agglomeration equipment, thus impairing its efficiency.

In another type of agglomerator, on the other hand, the moisture input during agglomeration is significantly lower, and in order to achieve products of comparable particle size and dispersibility, a larger percentage contribution of the unstable whey compounds is required.

It is understood that unstable lactose and stable lactose are the constituents which contribute the desirable agglomerating properties, and that whey is used as a source of lactose principally because of its low cost and ready availability, although stable and unstable lactose per se may be used. When an agglomerated product is not required, any of the other diluents or mixtures thereof may be used instead of a combination of unstable whey and stable whey. In that instance, it is possible to prepare the dry product directly from the emulsion concentrate, as described, with the omission of the agglomerating step. By such procedure, the enzyme-modified milk fat and diluent are preferably admixed and then spray dried by spraying the admixture into a drying chamber to reduce the moisture content to achieve from about a 95 to 99 percent total solids product. In the modification employing an edible oil, the oil is preferably admixed with the enzyme-modified milk fat and diluent prior to spray drying. Should seasoning and coloring materials be employed, they can be admixed subsequent to the spray drying, or it may be desirable to add the ingredients to the slurry prior to spray drying, although they are normally in solid form. After spray drying, if desired, the product may be agglomerated or instantized. Any liquid ingredient in the finished product is completely entrapped so that the product appears as a solid to the consumer.

For a more complete understanding of the present invention, reference is now made to the following specific examples which are illustrative of the preparation of the lipase enzyme-modified milk fat or butter oil concentrate of the present invention, its dilution and processing to a dry form, its caloric content, and to taste panel testing and gas chromatographic analysis demonstrating its butter-like flavor and concentration.

EXAMPLE 1

A lipase enzyme-modified milk fat emulsion concentrate having approximately 61 percent solids is prepared according to the following procedure:

A lipase enzyme system is prepared according to the teachings of U.S. Pat. No. 2,794,743. The enzyme system is suitably diluted and standardized to a specified lipase activity. 10 pounds of the standardized enzyme system are suspended in water to form an aqueous slurry, then thoroughly admixed with 100 pounds of milk fat, and emulsified to form a stable emulsion. The mass is incubated at a temperature of 90° F. until there is an increase in acidity equivalent to 3.25 ml. of $n/10$ sodium hydroxide per gram of total composition. The temperature of the incubated mass is then raised to 165° F. and held there for 10 minutes to inactivate the enzyme. To this lipase modified milk fat emulsion is added 8 percent butyric acid, 0.7 percent diacetyl and 1.1 percent butter oil esters expressed on the total weight composition of the final flavor concentrate mixture.

Additional examples, similar to example 1, were prepared using the same procedure but varying amounts of flavor and aroma principle as follows:

| Example % | 1A. | 1B. | 1C. | 1D. |
|---|---|---|---|---|
| Butyric acid | 4.0 | 4.0 | 4.0 | 2.0 |
| Diacetyl | 0.7 | 1.1 | 1.4 | 0.7 |
| Butter oil esters | 1.1 | 1.1 | 1.1 | 1.1 |

This procedure provides a lipase enzyme-modified milk fat emulsion concentrate with a flavor concentration approximately 160 times greater than that of fresh butter. These emulsion concentrates may be further diluted and processed to provide concentrated butter flavorants. This concentrate, however, has the aforementioned objectionable pungent cheesy odor.

EXAMPLE 2

A quantity of the emulsion concentrate of example 1 which contains 180 pounds of solids (nonaqueous matter) is placed in a stainless steel, steam-jacketed, dairy type mixing vat, and the temperature is raised to 100° to 105° F. 48 pounds of sodium bicarbonate powder is gradually added with mixing. During this addition, considerable foaming occurs, which results from carbon dioxide being liberated by the neutralization of the free acids in the concentrate. When gas formation has subsided, 276 pounds of delactosed whey, 24 pounds of gelatin and 120 pounds of non-fat dried milk solids are added along with sufficient water to reconstitute and/or dilute the mixture to 35 to 50 percent total solids. The entire mass is heated to 125° to 135° F. and homogenized.

The neutralized, homogenized mixture may be spray dried to provide a butter flavor concentrate containing about 28 percent lipase enzyme-modified milk fat on a solids basis, and the balance diluents. The product has approximately 80 times the flavor concentration of butter.

This and a number of additional examples (all of which were spray dried), were prepared from the ingredients in the proportions indicated in the following table:

| EXAMPLE | Percent by Weight 2 | 2B |
|---|---|---|
| Emulsion concentrate * | 27.8 | 19.4 |
| Sodium bicarbonate | 7.4 | 2.6 |
| Delactosed whey | 42.5 | — |
| Non-fat milk solids | 18.6 | 73.0 |
| Gelatin | 3.7 | 5.0 |

* Lipase enzyme-modified milk fat solids

The products produced by the procedure of this example were free from the previously described objectionable odors.

EXAMPLE 3

Spray Dried Concentrates

The following represents additional examples prepared following the procedures of example 2. Varying amounts of bicarbonate were used.

| EXAMPLE | A | B | C | D | E | F | G | H | I |
|---|---|---|---|---|---|---|---|---|---|
| Emulsion concentrate | 32.1 | 20.7 | 30 | 30 | 30 | 25.2 | 20.8 | 19.6 | 30.0 |
| Sodium bicarbonate | 4.0 | 2.5 | 8 | 7 | 3.9 | 3.1 | 2.6 | 2.6 | |
| Delactosed whey | | | 38 | 35 | 42.5 | 66.4 | | | 46.0 |
| Nonfat milk solids | | | 20 | 20 | 19.7 | | | | 20.0 |
| Gelatin | 4.9 | 4.8 | 4 | 8 | 3.9 | 5.3 | 4.8 | 5.8 | 4.0 |
| Condensed skim milk | 59.0 | 72.0 | | | | | 71.8 | 70.1 | |
| Gum arabic | | | | | | | | 1.9 | |
| pH [1] | 6.4 | 6.4 | 9.4 | 8.3 | 6.7 | 6.7 | 6.4 | 6.4 | [2]5.4–5.7 |

[1] pH of 10 grams dispersed in 100 cc. of water.
[2] This product made without buffering agent had a pungent cheesy odor.

EXAMPLE 4

Agglomerated Products

The dry product of examples 2 and 3 is blended with unstable whey, stable whey, spray dried butter-fat, corn syrup solids, salt and cellulose gum in the following proportions:

| | Parts by Weight | |
|---|---|---|
| | A | B |
| Butter flavor concentrate (dried) | 8.7 (Ex.2) | 13.0 (Ex.3B) |
| Unstable whey | 16.5 | 12.9* |
| Stable whey | 9.4 | 15.4 |
| Spray dried butter fat (80%) | 3.9 | 6.0 |
| Salt | 10.7 | 10.8 |
| Cellulose gum | 3.4 | 2.3 |
| Corn Syrup solids | 44.5 | 36.5 |
| Sodium bicarbonate | 2.9 | 2.0 |
| Total: | 100.0 | |
| Color and flavor enhancers | q.s. | |

* partially stabilized

The homogeneous mixture is then agglomerated by subjecting it to steam and then drying according to the conventional method. The product has a flavor concentration approximately 8 times that of butter, and is a dry free flowing solid with good storage stability characteristics.

EXAMPLE 5

For those applications where agglomeration is not required, the dry concentrate of examples 2 and 3, can be diluted as desired with a variety of diluents and thoroughly blended to yield products having specific properties. The following are exemplary of such products:

|  | Percent by Weight |
|---|---|
| 5A | |
| Dry Emulsion Concentrate | 9.0 |
| Salt | 11.0 |
| Corn Syrup solids (24 Dextrose) (Equivalents) | 80.0 |
| Total: | 100.0 |
| 5B | |
| Dry Emulsion Concentrate | 9.0 |
| Salt | 11.0 |
| Stable Whey | 80.0 |
| Total: | 100.0 |
| 5C | |
| Dry Emulsion Concentrate | 9.0 |
| Salt | 11.0 |
| Corn Syrup solids | 40.0 |
| Stable Whey | 40.0 |
| Total: | 100.0 |

GAS CHROMATOGRAPHY

It is generally recognized that the $C_4$–$C_{10}$ free fatty acids found in fresh butter contribute to the subtle flavor of butter. Thus, any increase in the proportion of $C_4$–$C_{10}$ fatty acids and/or an increase in concentration of the $C_4$–$C_{10}$ in butter or milk fat represents a flavor enrichment or flavor concentration. Such flavor enriched concentrate may then yield a butter flavor of any desired lesser concentration, depending upon dilution.

The free fatty acids, exclusive of butyric acid, of the non-buffered spray dried concentrate of example 2, were separated as their methyl esters by column chromatography, according to the method of Hornstein et al., Anal. Chem. 32, 54 (1960). For convenience, this analysis was performed on an unbuffered concentrate prepared in accordance with example 2. Buffering does not significantly alter the relative proportions of fatty acids present but serves to retain and passivate the acids until the normally acidic contribution of food to which the concentrate is added converts and releases these flavorful fatty acids. The percent by weight of the $C_6$–$C_{18}$ fatty acids was then determined by gas chromatography. A tabulation of these fatty acids appears in column 3 of table I. Similarly, a determination was made of the free fatty acid composition, exclusive of butyric acid, of the total free fatty acids in fresh butter. A tabulation of these fatty acids appears in column 4 of table I. Butyric acid, a four-carbon acid, cannot be readily determined by the Hornstein method. For that reason, a separate analysis for butyric acids was conducted, using the method of Keeney (Methods of Analysis of the A.O.A.C., Association of Official Agricultural Chemists, Washington, D.C., 1965, 224–245). On the basis of this analysis, the butyric acid content of the free fatty acids of the spray dried concentrate of example 2 was determined to be 84.0 mol percent. In addition, the total extractable acidity of this concentrate was determined and found to be 0.446 milliequivalent per gram.

To correlate the butyric acid ($C_4$) content, determined as mol percent, with the total extractable acidity and with the weight percentages of the $C_6$–$C_{18}$ fatty acids determined by gas chromatography, the average molecular weight of the total of the $C_6$–$C_{18}$ fatty acids was calculated, and the mol percentages of butyric acid and of the $C_6$–$C_{18}$ fatty acids were converted to weight percent. The respective weight percentages of the $C_4$–$C_{10}$ free fatty acid fraction of the total fatty acids present in the concentrate are set forth in column 5 of table I. Column 6 reflects the published data for the $C_4$–$C_{10}$ fatty acid fraction of the total (0.0135 percent) of free fatty acids normally present in butter fat derived from fresh butter (D. D. Bills et al., J. D. Science, 46, 1,342–6, 1963).

TABLE I

| Acid | 1 Chain length | 2 | 3 Free fatty acid composition of total fatty acids (exclusive of butyric acid) in concentrate | 4 Free fatty acid composition of total fatty acids in fresh butter (by gas chromatography) | 5 Free fatty acid fraction ($C_4$–$C_{10}$) of total fatty acids in concentrate | Free fatty acid fraction ($C_4$–$C_{10}$ of total free fatty acids present in butter (published data) |
|---|---|---|---|---|---|---|
| Butyric | 4:0 | | | | 66.16 | 1.32 |
| Caproic | 6:0 | | 0.715 | | 0.25 | 0.65 |
| Caprylic | 8:0 | | 1.239 | 0.22 | 0.44 | 0.83 |
| Capric | 10:0 | | 4.279 | 2.99 | 1.52 | 1.41 |
| Subtotals ($C_4$–$C_{10}$) | | | 6.233 | 3.21 | 68.37 | 4.21 |
| Lauric | 12:0 | | 6.485 | 6.09 | | |
| Myristoleic [1] | 14:1 | | 1.933 | 1.86 | | |
| Myristic | 14:0 | | 16.594 | 12.98 | | |
| 15 branched chain | 15:0 | | 1.148 | 1.10 | | |
| Pentadecanoic | 15:0 | | 1.440 | 1.49 | | |
| Palmitoleic [1] | 15:0 | | 3.212 | 3.39 | | |
| Palmitic | 16:1 | | 25.586 | 29.11 | | |
| 17 branched chain | 17:0 | | 0.806 | 1.13 | | |
| Heptadecanoic | 17:0 | | 0.262 | | | |
| Oleic (18:1 & 2) [2] | 18:1, 2 | | 28.144 | 31.20 | | |
| Stearic | 18:0 | | 8.156 | 8.17 | | |
| Totals | | | 99.999 | 99.73 | | |

[1] One double bond
[2] One and two double bonds

Comparing the values for $C_4$–$C_{10}$ in column 5 with those in column 6, it is evident that the concentrate of the present invention is enriched with respect to the total $C_4$–$C_{10}$ fatty acid fraction and especially with respect to the butyric acid content. This underscores the degree of flavor concentration of the emulsion concentrate of the present invention.

TASTE PANEL EVALUATION

Concentration

The flavor strength of the concentrated butter flavorant of example 3 was determined by a panel of trained home economists on the basis of the actual quantities of concentrate required to achieve a flavor impact comparable to that of fresh butter. It was determined that in the instance of mashed potatoes where 3½ oz. by weight are normally prepared with 2 tablespoons of butter (1 oz. by weight), only 2 teaspoons (⅛ oz. by weight) of the concentrated butter flavorant were required to provide a flavor strength equivalent to that of butter. This established a flavor concentration ratio of approximately 1 part of concentrated butter flavorant to 8 parts of fresh butter. Similarly, 10 oz. of frozen corn and of frozen peas respectively, were each prepared with 2 tablespoons of fresh butter and were compared with the butter flavor strength of an equal weight of these same foods, each prepared with only ⅛ oz. of butter flavor concentrate. In each instance, the same ratio of butter to concentrated butter flavorant as before was observed, i.e., 1 part of butter flavored concentrate to 8 parts of fresh butter.

Flavor

The flavor quality of the butter flavorant concentrate of example 3, when compared to that of fresh butter, was evaluated in the following manner. Each member of a taste panel consisting of 100 persons was served successively two portions of a vegetable, one of which was prepared in accordance with the foregoing recipe with fresh butter and the other of which was prepared in a like manner with said butter flavorant concentrate. Members were not told that one of the samples contained butter, but only that each sample contained a butter flavorant. The vegetables employed in the test were frozen corn, frozen peas, and mashed potatoes. Each panelist was asked to rate each portion with respect to its taste and aroma similarity to natural butter flavor. The results obtained are set forth in tables II, III and IV.

TABLE II

Flavor Ratings on Dehydrated Potatoes

| Responses | Concentrated BUTTER Flavorant | Fresh Butter |
|---|---|---|
| Exactly like natural butter | 12 | 20 |
| Very much like natural butter | 22 | 30 |
| Pretty much like natural butter | 26 | 17 |
| Sub Total | 60 | 67 |
| Other Responses ("somewhat, very slightly, hardly at all, and not at all like natural butter") | 40 | 33 |

Aroma Ratings on Dehydrated Potatoes

| Responses | Concentrated Butter Flavorant | Fresh Butter |
|---|---|---|
| Exactly like natural | 10 | 12 |
| Very much like natural butter | 17 | 28 |
| Pretty much like natural butter | 22 | 19 |
| Sub Total | 49 | 59 |
| Other Responses | 51 | 41 |

TABLE III

Flavor Ratings on Corn

| Responses | Concentrated Butter Flavorant | Fresh Butter |
|---|---|---|
| Exactly like natural butter | 12 | 23 |
| Very much like natural butter | 29 | 21 |
| Pretty much like natural butter | 27 | 18 |
| Sub Total | 68 | 62 |
| Other Responses | 32 | 38 |

Aroma Ratings on Corn

| Responses | Concentrated Butter Flavorant | Fresh Butter |
|---|---|---|
| Exactly like natural butter | 12 | 19 |
| Very much like natural butter | 21 | 19 |
| Pretty much like natural butter | 21 | 13 |
| Sub total | 54 | 51 |
| Other Responses | 46 | 49 |

TABLE IV

Flavor Ratings on Peas

| Responses | Concentrated Butter Flavorant | Fresh Butter |
|---|---|---|
| Exactly like natural butter | 5 | 16 |
| Very much like natural butter | 16 | 27 |
| Pretty much like natural butter | 28 | 22 |
| Sub Total | 49 | 65 |
| Other Responses | 51 | 35 |

Aroma Ratings on Peas

| Responses | Concentrated Butter Flavorant | Fresh Butter |
|---|---|---|
| Exactly like natural butter | 5 | 14 |
| Very much like natural butter | 19 | 29 |
| Pretty much like natural butter | 19 | 19 |
| Sub Total | 43 | 62 |
| Other Responses | 57 | 38 |

The foregoing taste evaluations confirm the butter-like flavor and aroma of the concentrated butter flavorants of this invention.

Caloric Content

The caloric content of the emulsion concentrate of example 1 and of the dry concentrates of examples 2 and 4 was computed, based on the fat, protein, and carbohydrate constituents of each concentrate. These values, together with the published information for butter, are set forth in table V.

TABLE V

| | Calories Per 100 Grams |
|---|---|
| Emulsion Concentrate of Example 1 | 475 |
| Dry Concentrate of Example 2 (Flavor Concentrate 80 times that of Fresh Butter) | 480 |
| Dry Concentrate of Example 4 (Flavor Concentrate 8 times that of Fresh Butter) | 320 |
| Butter | 715 |

On a flavor equivalent basis, the difference in caloric content between the present butter flavor concentrates and that of fresh butter is even more significant. These figures are set forth in table VI.

TABLE VI

| | Caloric Content per Weight of Concentrate Equivalent in Flavor to 100 Grams of Butter |
|---|---|
| Dry Concentrate of Example 2 (1/80 × 480) | 6 Calories |
| Dry Concentrate of Example 4 (⅛ × 320) | 40 Calories |
| 100 grams of butter | 715 Calories |

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:

1. A concentrated food additive composition for imparting a butter-like flavor to a foodstuff, comprising on a weight basis:
   a. from about 1 to 95 percent of a lipase enzyme-modified milk fat containing on a lipase enzyme-modified milk fat basis, a flavor and aroma principle including up to 10 percent of butyric acid and up to about 2 percent of a compound selected from the group consisting of diacetyl, esterfied butter oil, and mixtures thereof;
   b. a bicarbonate buffering agent in an amount such that the pH of 10 grams of the composition in 100 milliliters of distilled water is from about 6 to 9.5; and
   c. from about 5 to 99 percent of an edible diluent selected from the group consisting of unstable lactose, stable lactose, unstable whey, stable whey, delactosed whey, milk solids, non-fat milk solids, corn syrup solids, sucrose, dextrins, edible fats and oils, gums, dextrose, fructose, gelatin, caseinates, cellulose gums and carboxymethylcellulose.

2. A composition according to claim 1 wherein the lipase enzyme-modified milk fat is present in an amount of from about 50 to 95 percent and the diluent is present in an amount of from 5 to 50 percent by weight (dry basis).

3. A composition according to claim 1, wherein the lipase enzyme-modified milk fat is present in an amount of from about 1 to 10 percent and the diluent is present in an amount of from about 90 to 99 percent by weight (dry basis).

4. A composition according to claim 1, wherein the lipase enzyme-modified milk fat is present in an amount of up to about 80 percent by weight and the diluent is present in an amount of from 20 to 99 percent by weight (dry basis).

5. A composition according to claim 1, wherein the lipase enzyme-modified milk fat is present in an amount up to 70 percent and the diluent from 30 to 99 percent by weight (dry basis).

6. A composition according to claim 1, wherein the flavor and aroma principles are present in the lipase enzyme-modified milk fat in an amount of up to about 14 percent by weight.

7. A composition according to claim 1, wherein the buffering agent is selected from the group consisting of sodium and potassium bicarbonate.

8. A dry free flowing agglomerated composition according to claim 1, wherein the edible diluent comprises a combination of stable lactose and unstable lactose, and the buffering agent is sodium bicarbonate.

9. A composition according to claim 1, wherein the buffering agent is sodium bicarbonate and the edible diluent comprises a combination of unstable whey and stable whey.

10. A composition according to claim 9, wherein the ratio of the unstable whey to stable whey is from about 1:1 to about 3:1.

11. A process for providing butter flavored food additive compositions for imparting a butter-like flavor to a foodstuff which comprises admixing from about 1 percent to about 95 percent of a lipase enzyme-modified milk fat with, on a lipase enzyme-modified milk fat basis, up to 14 percent (solids basis) in the aggregate of a flavor and aroma principle including up to about 10 percent butyric acid and a compound selected from the group consisting of esterified butter oil, diacetyl and mixtures thereof, combining the resulting lipase enzyme-modified milk fat with from about 5 to 99 percent of an edible diluent selected from the group consisting of unstable lactose, stable lactose, unstable whey, stable whey, delactosed whey, milk solids, non-fat milk solids, corn syrup solids, sucrose, dextrins, edible fats and oils, gums, dextrose, fructose, gelatin, caseinates, cellulose gums and carboxymethylcellulose, and adjusting the pH of the admixture to from about 6 to about 9.5 by the addition of a bicarbonate buffering agent.

12. A process according to claim 11, wherein the lipase enzyme-modified milk fat is prepared by adding a lipase enzyme system comprising the ground edible tissues between the base of the tongue and the trachea of milk fed animals to a milk fat aqueous emulsion incubating the mixture to form a lipase enzyme-modified milk fat and then heating the incubated mass to a temperature sufficient to inactivate the enzyme.

13. A process according to claim 11, which comprises drying the buffered product.

14. A process according to claim 13, wherein the buffered product is dried by spray drying.

15. A process according to claim 11, wherein the pH is adjusted to from 6.2 to 7.0.

16. A process according to claim 11, wherein the butyric acid is added in an amount of up to 10 percent and the diacetyl and butter oil esters in an amount of up to 2 percent respectively.

17. A process according to claim 11, wherein the diluent is added in an amount to produce a composition which contains from about 50 to 95 percent by weight of enzyme-modified milk fat and from about 5 to 50 percent by weight edible diluent (dry basis).

18. A process for producing a dry agglomerated product which comprises spray drying the product of the process of claim 11, blending said product with a mixture of unstable and stable whey in a ratio of 3:1 to 1:1, spray dried butter-fat, salt, cellulose gum, corn syrup solids and additional buffering agent in an amount sufficient to produce a pH in the final agglomerated product of from about 6.0 to 9.5, and agglomerating the buffered admixture by subjecting it to steam and drying in an agglomerator to produce a dry free flowing particulate agglomerated butter flavored product.

19. A process according to claim 18, wherein the proportions of enzyme-modified milk fat and diluent are adjusted to produce a spray dried product that has a flavor strength in the order of from 50 to 100 times that of butter and an agglomerated product having a flavor strength in the order of 5 to 10 times that of butter.

20. The product of the process of claim 19.

* * * * *

UNITED STATES PATENT OFFICE
CERTIFICATE OF CORRECTION

Patent No. 3,653,921    Dated April 4, 1972

Inventor(s) Eric Engel, John H. Nelson, Clyde H. Amundson and Allen C. Buhler

It is certified that error appears in the above-identified patent and that said Letters Patent are hereby corrected as shown below:

Col. 4, l. 61      -  "160°-65°" should be "160-165°"

Col. 10, l. 43     -  "15:0" should be "16:1"
  (Table I)

Col. 10, l. 44     -  "16:1" should be "16:0"
  (Table I)

Col. 11, l. 42     -  After "natural" insert -- butter --

Signed and sealed this 18th day of July 1972.

(SEAL)
Attest:

EDWARD M. FLETCHER, JR.                ROBERT GOTTSCHALK
Attesting Officer                      Commissioner of Patents